Nov. 2, 1954

G. NEUMANN 2,693,499

STORAGE BATTERY CELL

Filed Jan. 24, 1952

INVENTOR
Georg Neumann
BY Fritz G. Hochwald
AGENT

United States Patent Office 2,693,499

Patented Nov. 2, 1954

1

2,693,499

STORAGE BATTERY CELL

Georg Neumann, Suresnes, France, assignor to Society "Bureau Technique Gautrat," Les Lilas, France, a society of France Application January 24, 1952, Serial No. 267,970

Claims priority, application France February 27, 1951

6 Claims. (Cl. 136—177)

The present invention relates to electrolytic cells and it is more especially, but not exclusively, concerned with storage battery cells.

It has already been proposed to produce, in a storage battery cell serving to accumulate electrical energy, recombination with the electrode active materials of the gases (oxygen and hydrogen) evolved in particular at the end of the charging of this cell, so as to make it possible to keep constantly closed the vessel in which said cell is housed.

In view of the fact that recombination of hydrogen is much slower than that of oxygen, it has also been proposed to give the negative electrode a higher capacity than the positive electrode and to provide the negative electrode with a greater power of accumulating energy under the effect of a charging current flowing through the accumulator, after insertion of the electrodes into the vessel and closing of said vessel and this in order to eliminate practically any development of hydrogen. However, in spite of this, the small amounts of hydrogen which may be formed are liable to accumulate and to give rise to objectionable overpressures when the storage battery is alternately charged and discharged at short intervals.

The object of my invention is to provide an electrolytic cell and in particular a storage battery cell which is better adapted to meet the requirements of practice than those existing at the present time and in particular which avoids any objectionable accumulation of gases, in particular of hydrogen, therein, while keeping all the advantages of constantly closed gas-tight storage batteries.

My invention consists chiefly in forming at least a portion of the wall of the vessel forming the cell envelope by a plate or diaphragm of a material, preferably a plastic material such as polyvinyl chloride or polyethylene, which is readily permeable to hydrogen, but to a much lesser degree to oxygen, in particular when these gases are at a pressure higher than the ambient pressure but which is perfectly impervious to liquids such as water.

Preferred embodiments of my invention will be hereinafter described with reference to the accompanying drawing, given merely by way of example, and in which.

It will be supposed, by way of example, that the embodiments hereinafter described relate to an alkaline storage battery cell.

This cell includes a vessel 1, for instance made of metal. This vessel contains a positive electrode 2 connected to the positive terminal 3 of the cell and a negative electrode 4 in electric contact with the wall of vessel 1, which wall constitutes the negative terminal.

Figure 1:
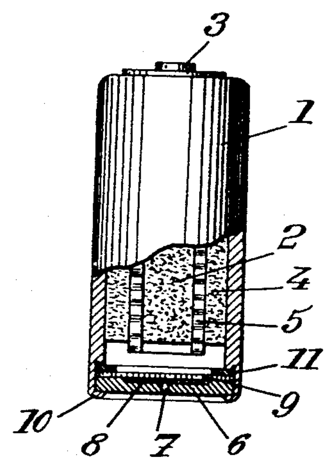
Fig. 1 is an elevational view partly in section of a storage battery cell according to my invention.

As shown by Fig. 1, electrodes 2 and 4 are concentric, the negative electrode 4 being of annular cross section and surrounding, at a distance therefrom, the positive electrode. The interval between the two electrodes is filled by a separator 5 impregnated with the electrolyte and preferably constituted in such manner that its elements, which retain the electrolyte by capallarity, form between them small pockets intended to receive the gases evolved in the cell, the dimensions of these pockets being so small that the portions of electrodes 2 and 4 located opposite them remain coated with electrolyte retained on these electrodes by surface tension effect. Preferably, separator 5 is constituted by a fabric of nylon threads. Such a separator, the details of which are described in U. S. Patent No. 2,571,927 to Uscha Gottesmann and Georg Neumann, for "Improvements in Electrolytic Cell, and in Particular Alkaline Cell," has for its effect to accelerate recombination with the active matter of the electrodes of the gases which are formed in the cell, in particular at the end of every charging period.

The capacity of the negative electrode 4, which depends upon the amount of its active mass, is chosen higher than that of the positive electrode 2.

The bottom of the vessel is constituted by a plate 6 provided with a hole 7. This hole is covered by a grid 8 and by a diaphragm 9 made of a plastic material, such as polyvinyl chloride or polyethylene, capable of letting gases pass therethrough, especially when they are under pressure, while stopping any liquid.

The thickness of this diaphragm may range from some hundredths to some tenths of a millimeter. As a rule it can be stated that the thickness of this diaphragm is the smaller as its area is smaller and vice versa.

Elements 6, 8 and 9 are fixed at the lower end of the vessel by means of an inward flange 10 obtained by stamping and a packing joint is provided at 11.

Grid 8 may be dispensed with if closure plate 6 is made rough on its inner face, for instance by sand blasting or otherwise.

The storage cell battery above described is normally closed and remains closed, even during the periods of charging thereof. The gases formed therein, especially at the end of the charging period, recombine nearly wholly with the active matter of the electrodes. However if, despite this recombination, for instance when charging and discharging follow each other at a high rate, some accumulation of gas, in particular of hydrogen, tends to take place in the cell, these gases, and especially hydrogen, can flow through diaphragm 9 by diffusion, and pass into the atmosphere through grid 8 and the hole 7 of plate 6. However, these amounts of gas are so small that, even after the cell has been in use for a long time, they involve no appreciable reduction of the electrolyte present in this cell. Therefore, normally, such a cell requires no upkeep. The extremely small amount of gas flowing out through diaphragm 9 is also quite negligible in the vicinity of the storage cell or of a battery constituted by a plurality of said cells.

The storage cell according to my invention, although not rigirously gas-tight, has all the advantages of a thoroughly gas-tight storage cell.

Concerning the stage of charge of the electrodes when the cell is closed, contrary to the case of a wholly gas-tight storage cell, the electrodes, the negative one being of higher capacity than the positive one, may be placed in the cell fully charged. When the cell is next charged, a small amount of hydrogen will be formed, but this hydrogen will flow out through diaphragm 9 much more quicker than oxygen, the rate of diffusion of which through the diaphragm is much lower. This modifies the state of charge of the electrodes in such manner that the negative electrode will no longer be fully charged. Consequently, at the end of charging, the potential of the negative electrode will no longer have a value permitting an important disengagement of hydrogen. If the cell is however further charged, the oxide still present in the negative electrode will no longer be reduced since the free oxygen coming from the anode causes an oxidizing of the negative electrode, insofar as this last mentioned electrode is reduced by the charging current. The modification of the state of charge of the electrodes goes on until the mean composition of the gases passing through diaphragm 9 corresponds to the composition of water $H_2O$.

It should however be noted that it is generally advantageous to provide, as soon as the cell is closed, for the most advantageous state of charge of the electrodes, in order thus to obtain correct operation of the cell from this time on. The most advantageous state of charge is that for which the negative electrode, which has the higher capacity, also has a higher possibility of accumulating energy under the action of a charging current than the positive electrode. For this purpose, I may for instance slightly discharge the negative electrode which, prior to this, was fully charged, as is the positive electrode, this partial discharging being carried out before the vessel is closed, for instance by means of an auxiliary electrode. Another way of obtaining a partial discharge of the negative electrode consists in adding to the electrolyte an oxidation substance, for instance hypobromide (KOBr), the amount of which is chosen in such manner that it discharges the negative electrode to the desired degree. The oxidation substance is to be chosen such that its residues do not influence in a detrimental way the operation of the cell.

If the capacity of the negative electrode is for instance 50% higher than that of the positive electrode, the negative electrode is discharged by about 25%. Thus, when the positive electrode is fully charged, the negative electrode has a charge higher than that of the positive electrode, without being however fully charged. The advantage of this was explained in my U. S. patent application Ser. No. 196,376, filed November 18, 1950, now Patent No. 2,636,058, for "Gas-Tight Storage Batteries and Methods of Manufacturing Them."

As above stated, the storage cell according to my invention is normally closed, and this not only during the periods for which it is discharging but also during the periods for which it is being charged. However, in the case of a cell of relatively high capacity, it will be useful to make it possible to open it without destroying it, so as to be able to inspect its elements, at relatively long intervals of time. Of course, the opening provided for this purpose is normally tightly sealed.

Figure 2:
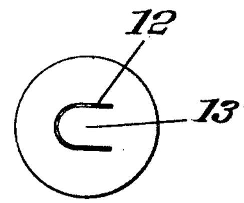
Fig. 2 shows a modification of the bottom of such a cell.

Fig. 2 shows a modification of the bottom of the storage cell. In this case, hole 7 is replaced by a U-shaped slot 12, forming a kind of tongue 13. This arrangement is intended to act as a kind of safety valve, since, if the pressure in the cell grows too high, it causes a deformation of tongue 13, which bends outwardly. This deformation of tongue 13 results in a tearing of diaphragm 9.

Of course the whole, or at least a substantial portion of the wall of the vessel forming the cell envelope, may be made of one of the matters, such as polyvinyl chloride or polyethylene, above referred to, the area of the diffusion surfaces thus provided making it possible to give the wall thus constituted a thickness sufficient to enable it to withstand the mechanical stresses normally imposed on this wall.

Although it has been supposed above that the cell is an alkaline one, it might also be an acid one.

My invention applies to electrolytic cells in general, for instance to cells having a negligible power of accumulating energy and acting merely as polarizing cells intended to keep the voltage constant in a circuit through which flows a current supplied from a source independent of said cell.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An electric rechargeable alkaline storage battery cell comprising a closed vessel and in said vessel a positive electrode, a negative electrode, and means to provide free access of the developed gases to said negative electrode, a portion of the inner wall of said vessel being made of a material readily permeable by hydrogen but difficultly permeable by oxygen.

2. An electrolytic storage battery cell as defined in claim 1 wherein at least a portion of the vessel is made of polyvinyl chloride.

3. An electrolytic storage battery cell as defined in claim 1 wherein at least a portion of the vessel is made of polyethylene.

4. An electric rechargeable alkaline storage battery cell comprising a metal vessel, said metal vessel being provided with a hole, and in said vessel a positive electrode, a negative electrode, means to provide free access of the developed gases to said negative electrode, and a diaphragm covering said hole inwardly and made of a material readily permeable by hydrogen but difficultly permeable by oxygen.

5. An electrolytic storage battery cell as defined in claim 4 wherein the diaphragm is made of a plastic selected from the group consisting of polyvinyl chloride and polyethylene, said diaphragm having substantially its entire surface exposed to said developed gases.

6. A cell according to claim 4 in which said hole is in the form of a U-shaped slot.

References Cited in the file of this patent

UNITED STATES PATENTS

| Number | Name | Date |
|---|---|---|
| 1,969,630 | Sprague et al. | Aug. 7, 1934 |
| 2,505,014 | Terlizzi et al. | Apr. 25, 1950 |
| 2,509,249 | Rhodes | May 30, 1950 |
| 2,554,504 | Ruben | May 29, 1951 |
| 2,569,159 | Gelardin | Sept. 25, 1951 |
| 2,595,963 | Lewis et al. | May 6, 1952 |

FOREIGN PATENTS

| Number | Country | Date |
|---|---|---|
| 671,707 | France | Dec. 18, 1929 |
| 414,582 | Great Britain | Aug. 9, 1934 |